United States Patent
Ouyang (10) Patent No.: US 10,263,528 B2
(45) Date of Patent: Apr. 16, 2019

(54) RESONANT CONVERTER WITH ADAPTIVE SWITCHING FREQUENCY AND THE METHOD THEREOF

(71) Applicant: Chengdu Monolithic Power Systems Co., Ltd., Chengdu (CN)

(72) Inventor: Qian Ouyang, Hangzhou (CN)

(73) Assignee: Chengdu Monolithic Power Systems Co., Ltd., Chengdu (CN)

(*) Notice: Subject to any disclaimer, the term of this patent is extended or adjusted under 35 U.S.C. 154(b) by 0 days.

(21) Appl. No.: 15/897,116

(22) Filed: Feb. 14, 2018

(65) Prior Publication Data

US 2018/0262116 A1 Sep. 13, 2018

(30) Foreign Application Priority Data

Mar. 13, 2017 (CN) .......................... 2017 1 0144662

(51) Int. Cl.
| | |
|---|---|
| *H02M 3/335* | (2006.01) |
| *H02M 3/337* | (2006.01) |
| *H02M 1/00* | (2006.01) |
| *H02M 1/08* | (2006.01) |

(52) U.S. Cl.
CPC ..... *H02M 3/33546* (2013.01); *H02M 3/3376* (2013.01); *H02M 3/33576* (2013.01); *H02M 3/33592* (2013.01); *H02M 1/083* (2013.01); *H02M 2001/0009* (2013.01); *H02M 2001/0058* (2013.01); *Y02B 70/1433* (2013.01); *Y02B 70/1491* (2013.01); *Y02P 80/112* (2015.11)

(58) Field of Classification Search
CPC ..... H02M 2001/0058; H02M 3/33538; H02M 3/33592; H02M 1/083; H02M 2001/0083
See application file for complete search history.

(56) References Cited

U.S. PATENT DOCUMENTS

| | | | |
|---|---|---|---|
| 7,116,089 B1 | 10/2006 | Nguyen et al. | |
| 9,166,481 B1* | 10/2015 | Vinciarelli | H02M 3/33569 |
| 9,379,630 B2 | 6/2016 | Miao | |
| 9,685,876 B2 | 6/2017 | Liu et al. | |
| 9,812,975 B2 | 11/2017 | Chen | |
| 9,893,635 B2 | 2/2018 | Lin | |
| 2004/0056644 A1* | 3/2004 | Wang | H02M 3/1588 323/288 |
| 2011/0038182 A1* | 2/2011 | Li | H02M 3/33592 363/21.06 |
| 2014/0253089 A1* | 9/2014 | Qin | H02M 3/158 323/316 |

OTHER PUBLICATIONS

U.S. Appl. No. 15/665,354, filed Jul. 31, 2017, Chengdu Monolithic Power Systems.
U.S. Appl. No. 15/297,085, filed Oct. 19, 2016, Chengdu Monolithic Power Systems.
U.S. Appl. No. 15/846,137, filed Dec. 18, 2017, Hangzhou MPS Semiconductor Technology Ltd.

* cited by examiner

*Primary Examiner* — Harry R Behm
(74) *Attorney, Agent, or Firm* — Perkins Coie LLP (57) ABSTRACT

A resonant converter with adaptive switching frequency operates continuously at best efficiency point. A power switch at primary side is turned off when a current flowing through a corresponding output power stage at secondary side falls to zero.

15 Claims, 5 Drawing Sheets

Figure 8

RESONANT CONVERTER WITH ADAPTIVE SWITCHING FREQUENCY AND THE METHOD THEREOF

CROSS-REFERENCE TO RELATED APPLICATIONS

This application claims priority to and the benefit of Chinese Patent Application No. 201710144662.X, filed Mar. 13, 2017, which is incorporated herein by reference in its entirety.

FIELD

The present invention relates to electronic circuits, more specifically, the present invention relates to resonant converter.

BACKGROUND

Resonant converters such as LLC resonant converters are widely used in bus converters where no stringent load regulation is required. The resonant converter typically works with open loop control, and is designed to operate at a switching frequency fs as following equation (1) for best efficiency performance.

$$f_s = \frac{1}{2 \times \Pi \times (Lr \times Cr + Tdead)} \quad (1)$$

wherein Lr represents the inductance of a leakage inductor, Cr represents the capacitance of a resonant capacitor, Tdead represents the dead time between a high-side power switch and a low-side power switch in a power stage.

This switching frequency works well under heavy load condition. However, the leakage inductor and the resonant capacitor in real applications may deviate far from their preset values, causing the resonant converter to deviate from its best efficiency point.

SUMMARY

It is an object of the present invention to provide an improved resonant converter, which solves the above problems.

In accomplishing the above and other objects, there has been provided, in accordance with an embodiment of the present invention, a resonant converter, comprising: an input power stage, including at least a first power switch and a second power switch coupled in series between an input port and a primary reference ground; a resonant net, a transformer, and an output power stage, coupled between the input power stage and an output port, the output power stage including a first synchronous power switch and a second synchronous power switch, coupled between the transformer and the output port; and a control circuit, configured to control the first synchronous power switch, the second synchronous power switch, the first power switch and the second power switch in response to a current flowing through the first synchronous power switch and a current flowing through the second synchronous power switch: when the current flowing through the first synchronous power switch falls to zero, the first synchronous power switch and the first power switch are turned off; and when the current flowing through the second synchronous power switch falls to zero, the second synchronous power switch and the second power switch are turned off.

In addition, there has been provided, in accordance with an embodiment of the present invention, a method used in a resonant converter, the resonant converter including an input power stage having a first power switch and a second power switch, a resonant net, a first output power stage and a second output power stage, the method comprising: generating a clock signal with 50% duty cycle, so as to control the first power switch and the second power switch; and monitoring a current flowing through the first output power stage and the second output power stage: when the current flowing through the first output power stage is zero, turning off the first power switch and the first output power stage; and when current flowing through the second output power stage is zero, turning off the second power switch and the second output power stage.

Furthermore, there has been provided, in accordance with an embodiment of the present invention, a resonant converter, comprising: an input power stage, including at least a first power switch and a second power switch, the first power switch and the second power switch being configured to be turned on/off complementarily; a first synchronous power switch and a second synchronous power switch, configured to be turned on/off complementarily, wherein the first synchronous power switch and the second synchronous power switch are coupled to the input power stage by way of a resonant net and a transformer; and a control circuit, configured to control the first synchronous power switch, the second synchronous power switch, the first power switch and the second power switch in response to a current flowing through the first synchronous power switch and a current flowing through the second synchronous power switch: when the current flowing through the first synchronous power switch falls to zero, the first synchronous power switch and the first power switch are turned off; and when the current flowing through the second synchronous power switch falls to zero, the second synchronous power switch and the second power switch are turned off.

DETAILED DESCRIPTION

Embodiments of circuits for resonant converter with adaptive frequency are described in detail herein. In the following description, some specific details, such as example circuits for these circuit components, are included to provide a thorough understanding of embodiments of the invention. One skilled in relevant art will recognize, however, that the invention can be practiced without one or more specific details, or with other methods, components, materials, etc.

The following embodiments and aspects are illustrated in conjunction with circuits and methods that are meant to be exemplary and illustrative. In various embodiments, the above problem has been reduced or eliminated, while other embodiments are directed to other improvements.

Figure 1:
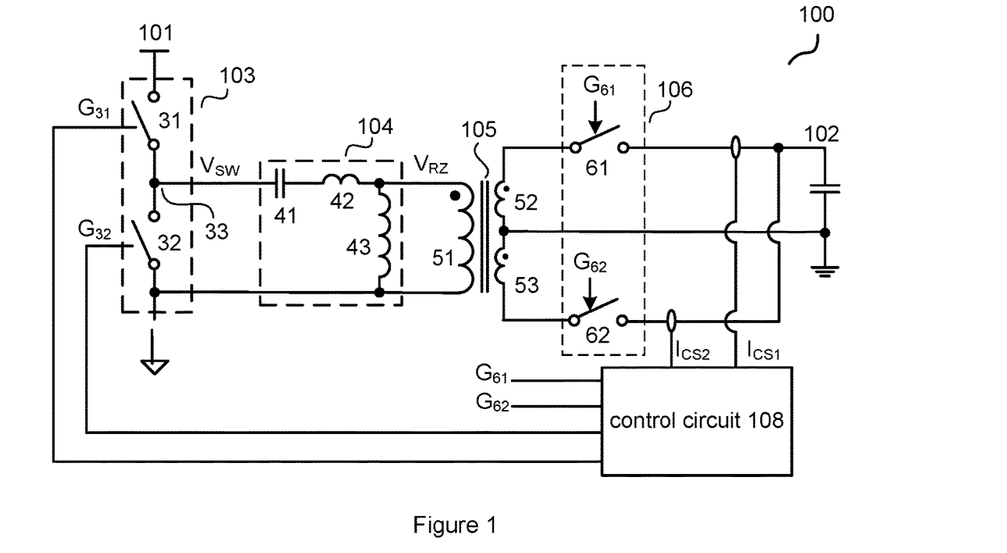
FIG. 1 schematically shows a resonant converter 100 in accordance with an embodiment of the present invention.

FIG. 1 schematically shows a resonant converter 100 in accordance with an embodiment of the present invention. In the example of FIG. 1, the resonant converter 100 comprises: an input power stage 103, including at least a first power switch 31 and a second power switch 32 coupled in series between an input port 101 and a primary reference ground; a resonant net 104, a transformer 105 and an output power stage 106, coupled between the input stage 103 and an output port 102 to generate a regulated output voltage $V_O$, the output power stage 106 including a first synchronous power switch 61 and a second synchronous power switch 62, coupled between the transformer 105 and the output port 102; and a control circuit 108, configure to control the first synchronous power switch 61, the second synchronous power switch 62, the first power switch 31 and the second power switch 32 in response to a current flowing through the first synchronous power switch 61 and a current flowing through the second synchronous power switch 62: wherein when the current flowing through the synchronous power switch 61 falls to zero, the first synchronous power switch 61 and the first power switch 31 are turned off; and when the current flowing through the second synchronous power switch 62 falls to zero, the second synchronous power switch 62 and the second power switch 32 are turned off.

In one embodiment, a switch voltage $V_{SW}$ is generated at a conjunction node 33 of the first power switch 31 and the second power switch 32. The resonant net 104 is configured to receive the switch voltage $V_{SW}$ to generate a resonant voltage $V_{RZ}$.

In the example of FIG. 1, the transformer 105 comprises: a primary winding 51, coupled to the resonant net 104; a first secondary winding 52, coupled to the first synchronous power switch 61; and a second secondary winding 53, coupled to the second synchronous power switch 62. The resonant net 104 comprises: a resonant capacitor 41 and an inductor 42, coupled in series between the conjunction node 33 and the primary winding 51. In one embodiment, the inductor 42 is a leakage inductance of the primary winding 51. In other embodiments, the inductor 42 may be an independent inductor. In real applications, the transformer further has a magnetic inductance 43, which is coupled to the primary winding 51 in parallel. The magnetic inductance 43, the resonant capacitor 41 and the inductor 42 together form a LLC resonant net.

In one embodiment, the input port 101 is configured to receive a 48V voltage signal provided by a front stage; and the output port 102 is configured to provide a regulated 12V or 6V voltage signal. The first power switch 31 and the second power switch 32 are controlled to be ON and OFF complementary; and have a same on time length in each switching cycle. That is, each of the first power switch 31 and the second power switch 32 has a duty cycle of 50%.

In the example of FIG. 1, the input power stage 103 includes a first power switch 31 and a second power switch 32, which is configured as a half bridge. However, one skilled in the art should realize that, the input power stage may be configured as a full bridge in other embodiments.

In one embodiment, the control circuit 108 is configured to receive a first current sense signal $I_{CS1}$ indicative of the current flowing through the first synchronous power switch 61 and a second current sense signal $I_{CS2}$ indicative of the current flowing through the second synchronous power switch 62, to generate control signals $G_{61}$, $G_{62}$, $G_{31}$ and $G_{32}$, which are used to control the first synchronous power switch 61, the second synchronous power switch 62, the first power switch 31 and the second power switch 32, respectively. In one embodiment, the first synchronous power switch 61 has a same switch (ON/OFF) state as the first power switch 31, and the second synchronous power switch 62 has a same switch (ON/OFF) state as the second power switch 32. That is, the first synchronous power switch 61 is controlled to be ON and OFF simultaneously as the first power switch 31; and the second synchronous power switch 62 is controlled to be ON and OFF simultaneously as the second power switch 32.

In real applications, the second power switch 32 is turned on after a dead time from the time point the first power switch 31 is turned off, and the first power switch 31 is turned on after a dead time from the time point the second power switch 32 is turned off. That is, there is a dead time between a falling edge of the control signal $G_{31}$ and a rising edge of the control signal $G_{32}$, and also between a falling edge of the control signal $G_{32}$ and a rising edge of the control signal $G_{31}$. However, the dead time is typically not reckoned in to the duty cycle. Because the first power switch 31 and the second power switch 32 are turned on alternately, and each has a same ON time in a switching cycle, the first power switch 31 and the second power switch 32 are still regarded as having a duty cycle of 50%.

Figure 2:
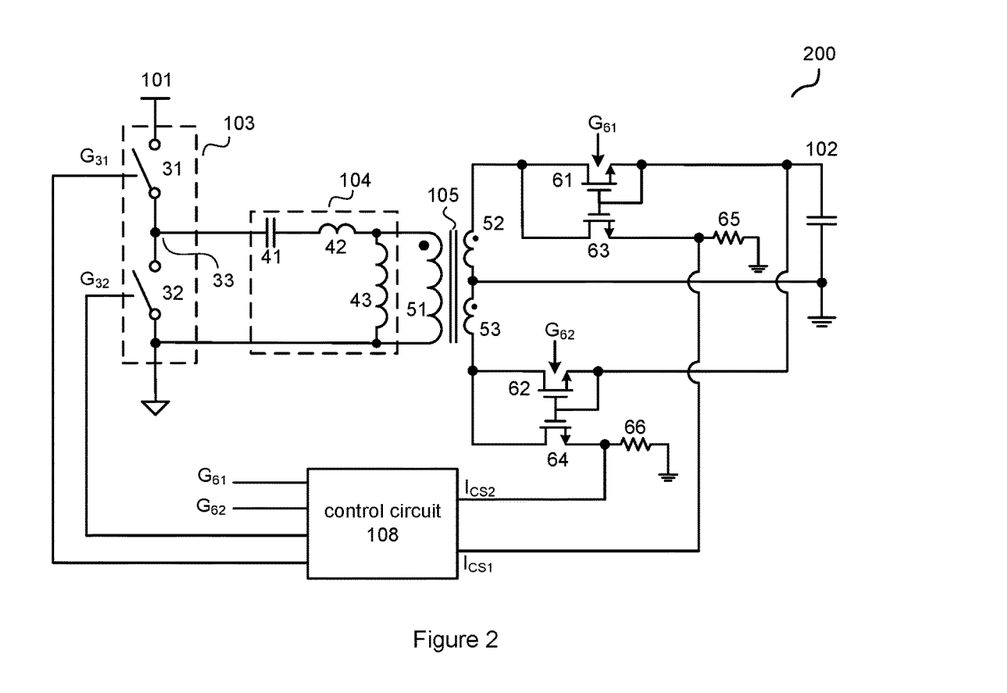
FIG. 2 schematically shows a resonant converter 200 in accordance with an embodiment of the present invention.

FIG. 2 schematically shows a resonant converter 200 in accordance with an embodiment of the present invention. The resonant converter 200 in FIG. 2 is similar to the resonant converter 100 in FIG. 1, with a difference that the resonant converter 200 in FIG. 2 schematically shows a current sense scheme for the current flowing through the first synchronous power switch 61 and the second synchronous power switch 62. Particularly, in the example of FIG. 2, the resonant converter 200 further comprises: a first sense switch 63, wherein a current flowing through the first sense switch 63 is proportional to the current flowing through the first synchronous power switch 61, e.g., the first sense switch 63 and the first synchronous power switch 61 form a current mirror; and a second sense switch 64, wherein a current flowing through the second sense switch 64 is proportional to the current flowing through the second synchronous power switch 62, e.g., the second sense switch 64 and the second synchronous power switch 62 also form a current mirror.

In one embodiment, the current flowing through the first synchronous power switch 61 is 10000 times of the current flowing through the first sense switch 63; and the current flowing through the second synchronous power switch 62 is also 10000 times of the current flowing through the second sense switch 64. However, one skilled in the art should realize that the current flowing through the first sense switch 63 and the current flowing through the first synchronous power switch 61 (or the current flowing through the second sense switch 64 and the current flowing through the second synchronous power switch 62) may have any other desired relationships.

Continue referring to FIG. 2, the resonant converter 200 further comprises: a first connect resistor 65, series coupled to the first sense switch 63, wherein a voltage across the first connect resistor 65 is the first current sense signal $I_{CS1}$, which is delivered to the control circuit 108; a second connect resistor 66, series coupled to the second sense switch 64, wherein a voltage across the second connect resistor 66 is the second current sense signal $I_{CS2}$, which is delivered to the control circuit 108.

In the example of FIG. 2, each of the synchronous power switches (61 & 62) and each of the sense switches (e.g. 63 & 64) comprise a metal oxide semiconductor field effect transistor (MOSFET). However, one skilled in the art should realize that the synchronous power switches and the sense switches may adopt other suitable switch devices (such as bipolar junction transistor, BJT).

The other circuit configurations and the operation principle of the resonant converter 200 in FIG. 2 are similar to the resonant converter 100 in FIG. 1.

Figure 3:
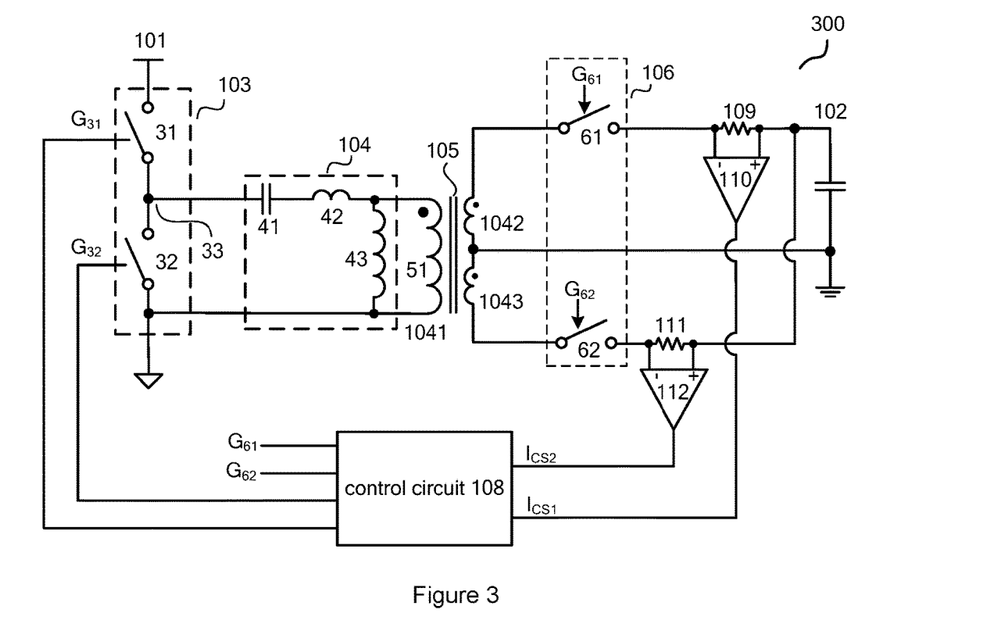
FIG. 3 schematically shows a resonant converter 300 in accordance with an embodiment of the present invention.

FIG. 3 schematically shows a resonant converter 300 in accordance with an embodiment of the present invention. The resonant converter 300 in FIG. 3 is similar to the resonant converter 100 in FIG. 1, with a difference that the resonant converter 300 in FIG. 3 schematically shows another current sense scheme for the current flowing through the first synchronous power switch 61 and the second synchronous power switch 62. Particularly, in the example of FIG. 3, the resonant converter 300 further comprises: a first sense resistor 109, series coupled to the first synchronous power switch 61; a first operation amplifier 110, coupled across the first sense resistor 109 to receive a voltage across the first sense resistor 109, to provide the first current sense signal $I_{CS1}$ to the control circuit 108; a second sense resistor 111, series coupled to the second synchronous power switch 62; and a second operation amplifier 112, coupled across the second sense resistor 111, to receive a voltage across the second sense resistor 111, to provide the second current sense signal $I_{CS2}$ to the control circuit 108.

In the example of FIG. 3, the current sense for the current flowing through the first synchronous power switch 61 and the second synchronous power switch 62 is achieved by sense resistors. However, one skilled in the art should realized that, the current sense may be achieved by other forms, such as directly sensing the voltages across the first synchronous power switch 61 and the second synchronous power switch 62.

The other circuit configurations and the operation principle of the resonant converter 300 in FIG. 3 are similar to the resonant converter 100 in FIG. 1.

Figure 4:
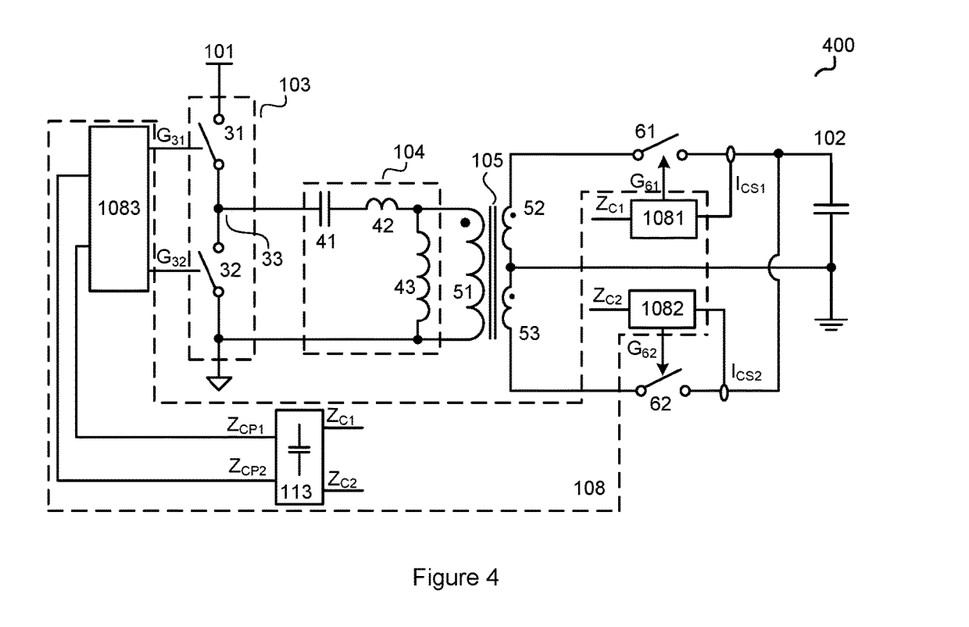
FIG. 4 schematically shows a resonant converter 400 in accordance with an embodiment of the present invention.

FIG. 4 schematically shows a resonant converter 400 in accordance with an embodiment of the present invention. The embodiment of FIG. 4 schematically shows a circuit configuration of the control circuit 108 in accordance with an embodiment of the present invention. In the example of FIG. 4, the control circuit 108 comprises: a first secondary controller 1081, configured to control the first synchronous power switch 61 in response to the current flowing through the first synchronous power switch 61 (i.e., in response to the first current sense signal $I_{CS1}$): when the current flowing through the first synchronous power switch 61 falls to zero, the first synchronous power switch 61 is turned off, and a first zero crossing signal $Z_{C1}$ is generated and delivered to a primary controller 1083 to turn off the first power switch 31; a second secondary controller 1082, configured to control the second synchronous power switch 62 in response to the current flowing through the second synchronous power switch 62 (i.e., in response to the second current sense signal $I_{CS2}$): when the current flowing through the second synchronous power switch 62 falls to zero, the second synchronous power switch 62 is turned off, and a second zero crossing signal $Z_{C2}$ is generated and delivered to the primary controller 1083 to turn off the second power switch 32; and the primary controller 1083, configured to control the first power switch 31 and the second power switch 32 in response to the first zero crossing signal $Z_{C1}$ and the second zero crossing signal $Z_{C2}$.

In one embodiment, the primary side and the secondary side may be not common-grounded, i.e., they may not have the same ground. Thus, electric isolation may be needed when signals generated at the secondary side are delivered to the primary side. FIG. 4 schematically shows such electric isolation. In the example of FIG. 4, the resonant converter 400 further comprises an isolation circuit 113, configured to convert the first zero crossing signal $Z_{C1}$ and the second zero crossing signal $Z_{C2}$ having the same ground as the secondary side into signals ($Z_{CP1}$ & $Z_{CP2}$) having the same ground as the primary side, which are then delivered to the primary controller 1083. In one embodiment, the isolation circuit 113 comprises a capacitor. But one skilled in the art should realize that in other embodiments, the primary side and the secondary side may refer to a same ground (i.e. they may be common-grounded). Then signals generated at the secondary side may be delivered to the primary side directly without isolation.

The other circuit configurations and the operation principle of the resonant converter 400 in FIG. 4 are similar to the resonant converter 100 in FIG. 1.

Figure 5:
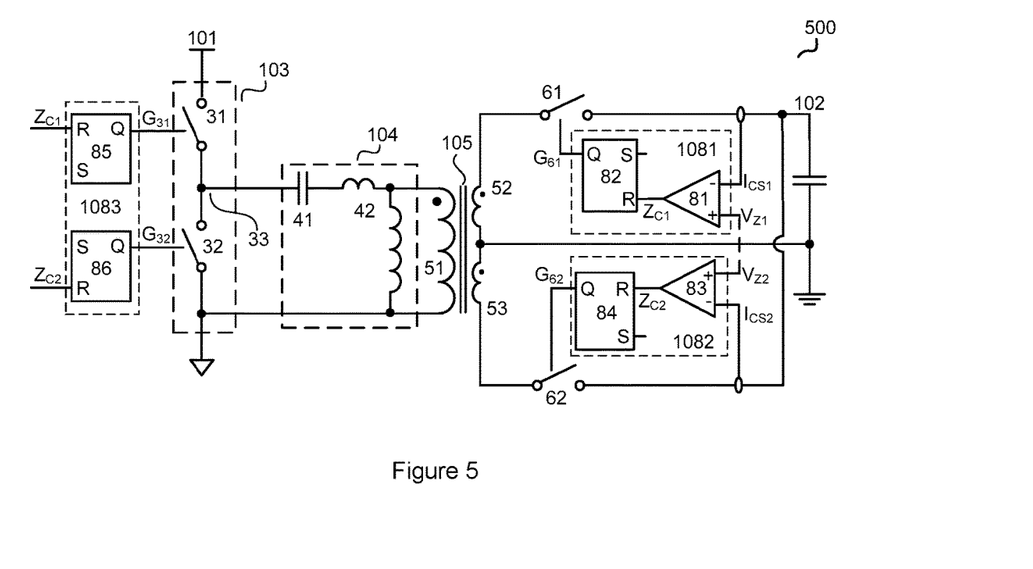
FIG. 5 schematically shows a resonant converter 500 with circuit configurations of each of the controller in the control circuit 108 in accordance with an embodiment of the present invention.

FIG. 5 schematically shows a resonant converter 500 with circuit configurations of each of the controller in the control circuit 108 in accordance with an embodiment of the present invention. In particular, the first secondary controller 1081 comprises: a first comparator 81, configured to compare the first current sense signal $I_{CS1}$ with a first zero reference $V_{Z1}$ to generate the first zero crossing signal $Z_{C1}$; and a first logical circuit 82, configured to turn off the first synchronous power switch 61 in response to the first zero crossing signal $Z_{C1}$. The second secondary controller 1082 comprises: a second comparator 83, configured to compare the second current sense signal $I_{CS2}$ with a second zero reference $V_{Z2}$ to generate the second zero crossing signal $Z_{C2}$; and a second logical circuit 84, configured to turn off the second synchronous power switch 62 in response to the second zero crossing signal $Z_{C2}$. The primary controller 1083 comprises: a third logical circuit 85, configured to turn off the first power switch 31 in response to the first zero crossing signal $Z_{C1}$; and a fourth logical circuit 86, configured to turn off the second power switch 32 in response to the second zero crossing signal $Z_{C2}$. In one embodiment, the first zero reference $V_{Z1}$ and the second zero reference $V_{Z2}$ comprise a same voltage value (e.g., 0.01V). As shown in FIG. 5, the first zero reference $V_{Z1}$ and the second zero reference $V_{Z2}$ are coupled together (i.e., the non-inverting input terminals of the first comparator 81 and the second comparator 82 are coupled together via dashed line).

The other circuit configurations and the operation principle of the resonant converter 500 in FIG. 5 are similar to the resonant converter 100 in FIG. 1.

Figure 6:
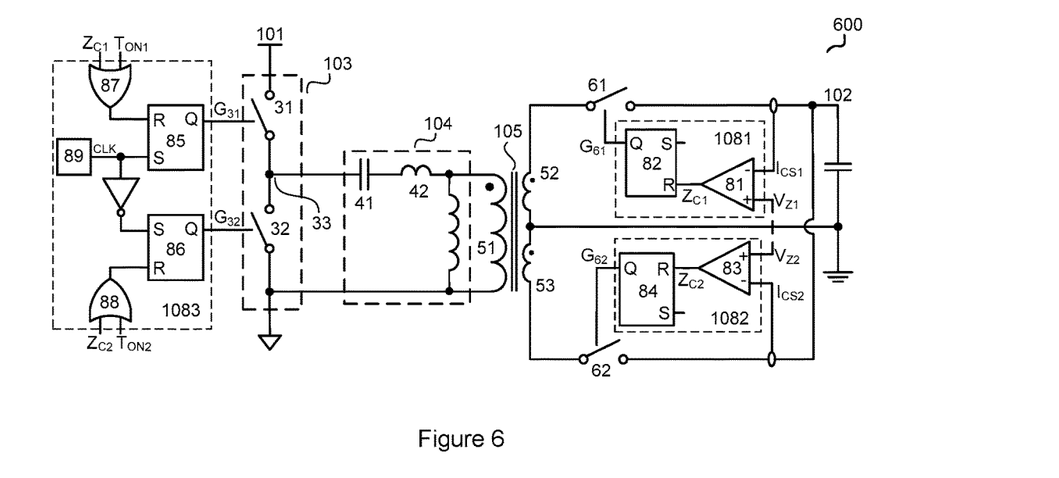
FIG. 6 schematically shows a resonant converter 600 in accordance with an embodiment of the present invention.

FIG. 6 schematically shows a resonant converter 600 in accordance with an embodiment of the present invention.

The resonant converter 600 in FIG. 6 is similar to the resonant converter 500 in FIG. 5, with a difference that, in the example of FIG. 6, the primary controller 1083 further comprises: a first logical OR unit 87, configured to generate a first reset signal in response to the first zero crossing signal $Z_{C1}$ and a first on-time signal $T_{ON1}$, wherein the first reset signal is configured to turn off the first power switch 31 by way of the third logical circuit 85; a second logical OR unit 88, configured to generate a second reset signal in response to the second zero crossing signal $Z_{C2}$ and a second on-time signal $T_{ON2}$, wherein the second reset signal is configured to turn off the second power switch 32 by way of the fourth logical circuit 86; and a clock signal generator 89, configured to provide a clock signal CLK having 50% duty cycle, wherein the clock signal CLK is configured to turn on the first power switch 31 by way of the third logical circuit 85, and wherein the clock signal CLK is configured to turn on the second power switch 32 by way of the fourth logical circuit 86 after being inverted.

That is, in the primary controller 1083, the third logical circuit 85 is configured to turn off the first power switch 31 in response to the first zero crossing signal $Z_{C1}$ or in response to the first on-time signal $T_{ON1}$; and to turn on the first power switch 31 in response to the clock signal CLK. The fourth logical circuit 86 is configured to turn off the second power switch 32 in response to the second zero crossing signal $Z_{C2}$ or in response to the second on-time signal $T_{ON2}$; and to turn on the second power switch 32 in response to the inverted clock signal.

Figure 7:
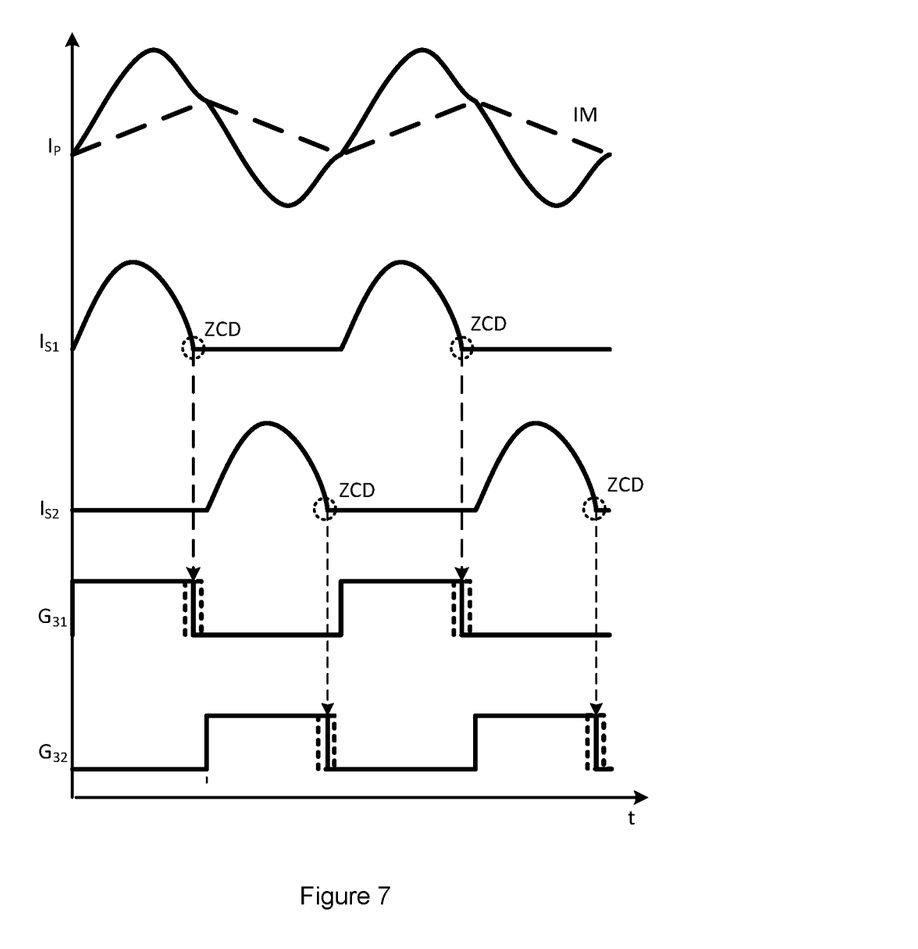
FIG. 7 schematically shows the waveforms of a primary current $I_P$, a current $I_M$ flowing through the magnetic inductance 43, the current $I_{S1}$ flowing through the first synchronous power switch 61, the current $I_{S2}$ flowing through the second synchronous power switch 62, the control signal $G_{31}$ of the first power switch 31, and the control signal $G_{32}$ of the second power switch 32 during the operation of the resonant converter.

FIG. 7 schematically shows the waveforms of a primary current $I_P$, a current $I_M$ flowing through the magnetic inductance 43, the current $I_{S1}$ flowing through the first synchronous power switch 61, the current $I_{S2}$ flowing through the second synchronous power switch 62, the control signal $G_{31}$ of the first power switch 31, and the control signal $G_{32}$ of the second power switch 32 during the operation of the resonant converter. As shown in FIG. 7, when $I_{S1}$ falls to zero (as marked as ZCD in FIG. 7), the control signal $G_{31}$ turns to low, so as to turn off the first power switch 31; and when $I_{S2}$ falls to zero (as marked as ZCD in FIG. 7), the control signal $G_{32}$ turns to low, so as to turn off the second power switch 32.

Figure 8:
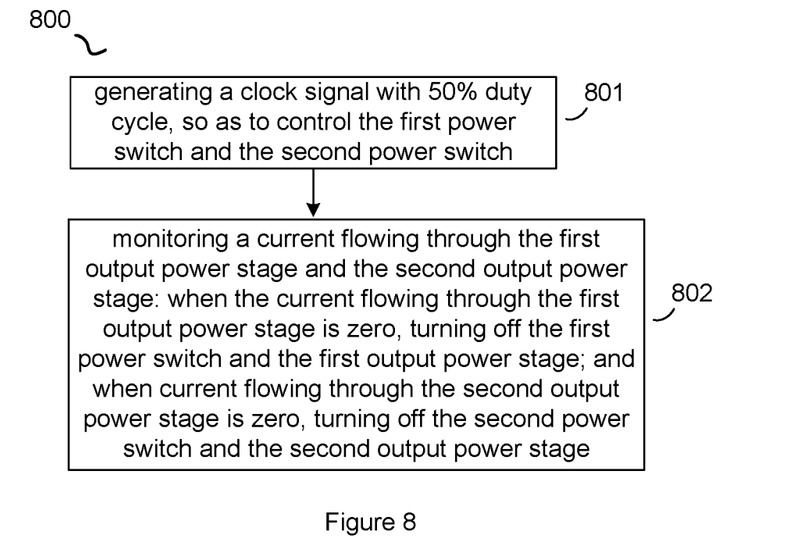
FIG. 8 schematically shows a flowchart 800 of a method used in a resonant converter in accordance with an embodiment of the present invention.

FIG. 8 schematically shows a flowchart 800 of a method used in a resonant converter in accordance with an embodiment of the present invention, the resonant converter including an input power stage having a first power switch and a second power switch, a resonant net, a first output power stage and a second output power stage, the method comprising:

Step 801, generating a clock signal with 50% duty cycle, so as to control the first power switch and the second power switch. And Step 802, monitoring a current flowing through the first output power stage and the second output power stage: when the current flowing through the first output power stage is zero, turning off the first power switch and the first output power stage; and when current flowing through the second output power stage is zero, turning off the second power switch and the second output power stage.

In one embodiment, the step monitoring the current flowing through the first output power stage and the second output power stage comprises: deriving a first current sense signal proportional to the current flowing through the first output power stage and a second current sense signal proportional to the current flowing through the second output power stage; comparing the first current sense signal with a first zero reference to generate a first zero crossing signal; and comparing the second current sense signal with a second zero reference to generate a second zero crossing signal; wherein the first power switch and the first output power stage are turned off in response to the first zero crossing signal, and are turned on in response to the clock signal; and wherein the second power switch and the second output power stage are turned off in response to the second zero crossing signal, and are turned on in response to an inverted signal of the clock signal. In one embodiment, the first zero reference is equal to the second zero reference.

In one embodiment, the first power switch and the first output power stage are turned on further in response to a first on time signal; and the second power switch and the second output power stage are turned on further in response to a second on time signal.

Several embodiments of the foregoing resonant converter and the method thereof provide higher efficiency compared to conventional technique. Unlike the conventional technique, several embodiments of the foregoing resonant converter adopt adaptive switching frequency control: when the current flowing through the output power stage at the secondary side falls to zero, the corresponding power switch at the primary side is turned off. Thus, the on-time length of the input power stage and the switching frequency are changed, so as to ensure the resonant converter operates at best efficiency point.

It is to be understood in these letters patent that the meaning of "A" is coupled to "B" is that either A and B are connected to each other as described below, or that, although A and B may not be connected to each other as described above, there is nevertheless a device or circuit that is connected to both A and B. This device or circuit may include active or passive circuit elements, where the passive circuit elements may be distributed or lumped-parameter in nature. For example, A may be connected to a circuit element that in turn is connected to B.

This written description uses examples to disclose the invention, including the best mode, and also to enable a person skilled in the art to make and use the invention. The patentable scope of the invention may include other examples that occur to those skilled in the art.

What is claimed is:

1. A resonant converter, comprising:
    an input power stage, including at least a first power switch and a second power switch coupled in series between an input port and a primary reference ground;
    a resonant net, a transformer, and an output power stage, coupled between the input power stage and an output port, the output power stage including a first synchronous power switch and a second synchronous power switch, coupled between the transformer and the output port; and
    a control circuit, configured to control the first synchronous power switch, the second synchronous power switch, the first power switch and the second power switch in response to a current flowing through the first synchronous power switch and a current flowing through the second synchronous power switch: when the current flowing through the first synchronous power switch falls to zero, the first synchronous power switch and the first power switch are turned off; and when the current flowing through the second synchronous power switch falls to zero, the second synchronous power switch and the second power switch are turned off;
    wherein the control circuit comprises:
    a first secondary controller, configured to control the first synchronous power switch in response to the current flowing through the first synchronous power switch: when the current flowing through the first synchronous power switch falls to zero, the first synchronous power switch is turned off, and a first zero crossing signal is generated and delivered to a primary controller to turn off the first power switch;

a second secondary controller, configured to control the second synchronous power switch in response to the current flowing through the second synchronous power switch: when the current flowing through the second synchronous power switch falls to zero, the second synchronous power switch is turned off, and a second zero crossing signal is generated and delivered to the primary controller to turn off the second power switch; and the primary controller, configured to control the first power switch and the second power switch in response to the first zero crossing signal and the second zero crossing signal.

2. The resonant converter of claim 1, further comprising:
a first sense switch, wherein a current flowing through the first sense switch is proportional to the current flowing through the first synchronous power switch; and
a second sense switch, wherein a current flowing through the second sense switch is proportional to the current flowing through the second synchronous power switch.

3. The resonant converter of claim 2, further comprising:
a first connect resistor, series coupled to the first sense switch, wherein a voltage across the first connect resistor is delivered to the control circuit; and
a second connect resistor, series coupled to the second sense switch, wherein a voltage across the second connect resistor is delivered to the control circuit.

4. The resonant converter of claim 1, further comprising:
a first sense resistor, series coupled to the first synchronous power switch;
a first operation amplifier, coupled across the first sense resistor to receive a voltage across the first sense resistor, to provide a signal indicative of the current flowing through the first synchronous power switch to the control circuit;
a second sense resistor, series coupled to the second synchronous power switch; and
a second operation amplifier, coupled across the second sense resistor to receive a voltage across the second sense resistor, to provide a signal indicative of the current flowing through the second synchronous power switch to the control circuit.

5. The resonant converter of claim 1, wherein the first secondary controller comprises:
a first comparator, configured to compare the first current sense signal with a first zero reference to generate the first zero crossing signal; and
a first logical circuit, configured to turn off the first synchronous power switch in response to the first zero crossing signal.

6. The resonant converter of claim 1, wherein the second secondary controller comprises:
a second comparator, configured to compare the second current sense signal with a second zero reference to generate the second zero crossing signal; and
a second logical circuit, configured to turn off the second synchronous power switch in response to the second zero crossing signal.

7. The resonant converter of claim 1, wherein the primary controller comprises:

a third logical circuit, configured to turn off the first power switch in response to the first zero crossing signal; and
a fourth logical circuit, configured to turn off the second power switch in response to the second zero crossing signal.

8. The resonant converter of claim 7, wherein:
the third logical circuit is further configured to turn off the first power switch in response to a first on time signal, and to turn on the first power switch in response to a clock signal; and
the fourth logical circuit is further configured to turn off the second power switch in response to a second on time signal, and to turn on the second power switch in response to an inverted signal of the clock signal.

9. The resonant converter of claim 1, wherein
the first synchronous power switch has a same conduction state as the first power switch; and
the second synchronous power switch has a same conduction state as the second power switch.

10. A method used in a resonant converter, the resonant converter including an input power stage having a first power switch and a second power switch, a resonant net, a first output power stage and a second output power stage, the method comprising:
generating a clock signal with 50% duty cycle, so as to control the first power switch and the second power switch; and
monitoring a current flowing through the first output power stage and the second output power stage: when the current flowing through the first output power stage is zero, turning off the first power switch and the first output power stage; and when current flowing through the second output power stage is zero, turning off the second power switch and the second output power stage;
wherein the step monitoring the current flowing through the first output power stage and the second output power stage comprises:
deriving a first current sense signal proportional to the current flowing through the first output stage and a second current sense signal proportional to the current flowing through the second output stage;
comparing the first current sense signal with a first zero reference to generate a first zero crossing signal; and
comparing the second current sense signal with a second zero reference to generate a second zero crossing signal
wherein:
the first power switch and the first output power stage are turned off in response to the first zero crossing signal, and are turned on in response to the clock signal; and
the second power switch and the second output stage are turned off in response to the second zero crossing signal, and are turned on in response to an inverted signal of the clock signal.

11. The method of claim 10, wherein the first zero reference is equal to the second zero reference.

12. A resonant converter, comprising:
an input power stage, including at least a first power switch and a second power switch, the first power switch and the second power switch being configured to be turned on/off complementarily;
a first synchronous power switch and a second synchronous power switch, configured to be turned on/off complementarily, wherein the first synchronous power switch and the second synchronous power switch are coupled to the input power stage by way of a resonant net and a transformer; and a control circuit, configured to control the first synchronous power switch, the second synchronous power switch, the first power switch and the second power switch in response to a current flowing through the first synchronous power switch and a current flowing through the second synchronous power switch: when the current flowing through the first synchronous power switch falls to zero, the first synchronous power switch and the first power switch are turned off; and when the current flowing through the second synchronous power switch falls to zero, the second synchronous power switch and the second power switch are turned off;

wherein the control circuit comprises:

a first secondary controller, configured to control the first synchronous power switch in response to the current flowing through the first synchronous power switch: when the current flowing through the first synchronous power switch falls to zero, the first synchronous power switch is turned off, and a first zero crossing signal is generated and delivered to a primary controller to turn off the first power switch;

a second secondary controller, configured to control the second synchronous power switch in response to the current flowing through the second synchronous power switch: when the current flowing through the second synchronous power switch falls to zero, the second synchronous power switch is turned off, and a second zero crossing signal is generated and delivered to the primary controller to turn off the second power switch; and the primary controller, configured to control the first power switch and the second power switch in response to the first zero crossing signal and the second zero crossing signal.

13. The resonant converter of claim 12, further comprising:

a first sense switch, wherein a current flowing through the first sense switch is proportional to the current flowing through the first synchronous power switch; and a second sense switch, wherein a current flowing through the second sense switch is proportional to the current flowing through the second synchronous power switch.

14. The resonant converter of claim 12, wherein the first secondary controller comprises:

a first comparator, configured to compare the first current sense signal with a first zero reference to generate the first zero crossing signal; and a first logical circuit, configured to turn off the first synchronous power switch in response to the first zero crossing signal.

15. The resonant converter of claim 12, wherein the second secondary controller comprises:

a second comparator, configured to compare the second current sense signal with a second zero reference to generate the second zero crossing signal; and a second logical circuit, configured to turn off the second synchronous power switch in response to the second zero crossing signal.

* * * * *